(12) United States Patent
Lee et al.

(10) Patent No.: US 11,115,190 B2
(45) Date of Patent: Sep. 7, 2021

(54) METHOD OF HASHING VECTOR DATA BASED ON MULTI-SCALE CURVATURE FOR VECTOR CONTENT AUTHENTICATION

(71) Applicant: Tongmyong University Industry-Academy Cooperation Foundation, Busan (KR)

(72) Inventors: Sukhwan Lee, Gimhae (KR); Eung Joo Lee, Busan (KR)

(73) Assignee: Tongmyong University Industry-Academy Cooperation Foundation, Busan (KR)

( * ) Notice: Subject to any disclaimer, the term of this patent is extended or adjusted under 35 U.S.C. 154(b) by 52 days.

(21) Appl. No.: 15/905,276

(22) Filed: Feb. 26, 2018

(65) Prior Publication Data

US 2019/0207753 A1    Jul. 4, 2019

Related U.S. Application Data

(63) Continuation of application No. PCT/KR2017/001871, filed on Feb. 21, 2017.

(30) Foreign Application Priority Data

Feb. 15, 2017    (KR) ........................ 10-2017-0020769

(51) Int. Cl.
*G06F 21/64* (2013.01)
*G06N 7/04* (2006.01)
(Continued)

(52) U.S. Cl.
CPC ............ *H04L 9/0643* (2013.01); *G06F 17/16* (2013.01); *G06T 9/00* (2013.01); *H04L 9/06* (2013.01); *H04N 21/83* (2013.01); *Y02D 30/50* (2020.08)

(58) Field of Classification Search
None
See application file for complete search history.

(56) References Cited

U.S. PATENT DOCUMENTS

| 10,248,663 B1 * | 4/2019 | Keisler ............... G06F 16/5854 |
| 2002/0136454 A1 * | 9/2002 | Park ................... G06F 16/5854 |
| | | 382/168 |

(Continued)

FOREIGN PATENT DOCUMENTS

| KR | 10-1394770 B1 | 5/2014 |
| KR | 10-2015-0013324 A | 2/2015 |
| KR | 10-2016-00030228 A | 3/2016 |

OTHER PUBLICATIONS

A semi-fragile watermarking algorithm for authenticating 2D CAD engineering graphics based on log-polar transformation. Peng. El Sevier. (Year: 2010).*

(Continued)

*Primary Examiner* — Venkat Perungavoor
(74) *Attorney, Agent, or Firm* — Nelson Mullins Riley & Scarborough LLP; Kongsik Kim, Esq.

(57) ABSTRACT

The present invention relates to a method of hashing a perceptual vector model based on a multi-scale curvature. According to a first aspect, there is provided a method of hashing a perceptual vector model based on a multi-scale curvature including: generating a multi-dimensional feature coefficient matrix, and obtaining a multi-dimensional intermediate hash coefficient matrix; and obtaining a final binary hash matrix, and enabling the multi-dimensional binary hash matrix to be hierarchically authenticated. In addition, according to a second aspect, there is provided a method of hashing a perceptual vector model based on a multi-scale (Continued)

curvature including: generating a hash by using a hash function; and authenticating a vector model. In addition, an error detection probability for an object attack can be lower by about $2\times10^{-5}$~$2.8\times10^{-2}$, and a uniqueness probability is raised by about 0.014. In addition, an entropy can be raised by about 0.875~2.149.

4 Claims, 8 Drawing Sheets

(51) Int. Cl.
*H04L 9/06* (2006.01)
*G06F 17/16* (2006.01)
*H04N 21/83* (2011.01)
*G06T 9/00* (2006.01)
*G06N 5/02* (2006.01)

(56) References Cited

U.S. PATENT DOCUMENTS

2005/0111742 A1* 5/2005 Seo ................. H04N 19/60
                                                382/233
2020/0004779 A1* 1/2020 Piereira ................. G06T 7/10

OTHER PUBLICATIONS

Shape Analysis Algorithm Based on Information Theory. Page. IEEE. (Year: 2003).*
The Core of Video Fingerprinting: Examples of Feature. Chao. (Year: 2009).*
Robust Hashing of Vector Data Using Generalized Curvatures of Polyline. Lee. IEEE. (Year: 2013).*
Polyline curvatures based robust vector data hashing. Lee. IEEE. (Year: 2013).*
The Core of Video Fingerprinting: Examples of Feature Extraction. Chao. (Year: 2009).*
Review of Image and Video Indexing Techniques. Idris. JVCIR. (Year: 1997).*

* cited by examiner

Objects $\hat{p}^s$ re-sampled in spatial scales of (a) $s=1$ ($\delta$), (b) $s=1/2$ ($2\delta$), (c) $s=1/3$ ($3\delta$), (d) $s=1/4$ ($4\delta$)

METHOD OF HASHING VECTOR DATA BASED ON MULTI-SCALE CURVATURE FOR VECTOR CONTENT AUTHENTICATION

CROSS-REFERENCE TO RELATED APPLICATION

The present application is a continuation application of International Application No. PCT/KR2017/018171 filed on Feb. 21, 2017, which claims priority to Korean Application No. KR 10-2017-0020769 filed on Feb. 15, 2017. The applications are incorporated herein by reference.

TECHNICAL FIELD

The present invention relates to a method of hashing a perceptual vector model based on a multi-scale curvature. More particularly, the present invention relates to a method of hashing a perceptual vector model based on a multi-scale curvature, the method purposing a vector data hashing method required for authenticating a vector data model and preventing the vector data model from being copied since application fields of the vector data model such as CAD design drawings and geographic information system (GIS) digital maps become wide, thus a protection method therefor is required.

BACKGROUND ART

2D/3D vector models have been widely used for various application contents for a long time, such as CAD design drawings used in industries such as architecture, automobiles, shipbuilding and IT hardware, digital vector maps of geographic information systems, and 3D printer STL models. In addition to the activation of the vector models, there have been various studies on the watermarking technique for the copyright protection of GIS vector maps and CAD design drawings, and the perceptual or parametric encryption technique for the authentication and integrity verification. However, Delp raised the importance of content authentication, not copyright protection, as well as business model changes toward the 22nd century content security technology.

There are two representative multimedia authentication techniques: cryptographic hashing and content perceptual hashing. Cryptographic hashing is sensitive to bit changes, thus it is not suitable for multimedia or contents that can be transformed into various forms while the quality is maintained. Until now, perceptual hashing for an image, a video, and a 3D mesh model which satisfy robustness and security requirements has been presented by many researchers. Perceptual hashing, such as watermarking, must be differently applied according to a data structure of the multimedia or content. For example, image and video are configured with frames or images such as pixel arrays having fixed positions and sizes. For perceptual hashing methods, methods based on a spatial domain of pixels, the frequency domain of polar Fourier transform (PFT), quaternion polar cosine transform (PCT), discrete cosine transform (DCT), and spatial-temporal domain are purposed. A 3D mesh model is configured with triangular meshes with regular or unfixed 3D vertex coordinates. 3D mesh perceptual hashing methods which are based on a geometric shape feature distribution, and a mesh heat kernel signature (HKS) have been purposed. However, methods for hashing an image, a video, and a 3D modeling are not applicable to CAD design drawings based on a polygonal shape vector (components) such as polygon, polyline, etc. and to a vector data model such as GIS vector map.

A vector data model is configured with a number of layers, and a modeling thereof is performed by using a primitive component such as points, polylines, polygons, and ellipses in each layer. Herein, different to a 3D mesh model, each primitive component is independent and does not have correlation with another component. Recently, a vector model authentication method and copyright protection method based on a cryptographic hash and a zero-watermark such as SHA-1, MD5, etc. have been purposed. However, a cryptographic hash is easily changed by vector model editing, and the vector shape features used in zero-watermark are not robust and secure against various attacks. Lee et al. presented a single hashing method of a vector model based on primary and secondary polyline curvature coefficient distributions using a Frenet frame and a generalized curvature. The primary and secondary polyline curvature coefficient distributions have robustness against attacks such as re-parameterization, Euclidean transformation, rearrangement, and object simplification. However, recently, as the scale, volume, and precision of vector models have increased, robustness and security performances are not satisfied by a single hash authentication.

Accordingly, development of a method of hashing a vector model based on a multi-scale curvature, the method providing efficient hierarchical authentication of a vector map with high accuracy or a design drawing, and having excellent robustness, uniqueness, and security performances, has been required.

SUMMARY

Accordingly, the present invention has been made keeping in mind the above problems occurring in the prior art, and an object of the present invention is to provide a method of hashing a perceptual vector model based on a multi-scale curvature, wherein the method generates a hash being robust against various attacks and satisfying security by a random key and uniqueness performances by grouping polylines on a main layer within a vector data model, generating a group coefficient according to primary and secondary polyline curve curvature distributions, obtaining a feature coefficient by projecting the group coefficient onto a random pattern, and generating a final binary hash by performing binarization for the same.

In addition, the present invention is to provide a method of hashing a perceptual vector model based on a multi-scale curvature in which an error detection probability for an object attack such as object simplification, removing, copying, breaking, etc. is lower than a conventional method by about $2 \times 10^{-5} \sim 2.8 \times 10^{-2}$. In addition, the purposed method has a uniqueness probability being higher by about 0.014 than a conventional method when hash uniqueness is evaluated for three types of a model-key, a key, and a model.

In addition, the present invention is to provide a method of hashing a perceptual vector model based on a multi-scale curvatures in which an entropy is higher by about 0.875~2.149 than an entropy of a conventional method when security performance is evaluated based on a differential entropy.

However, objects of the present invention are not limited to the objects described above, and other objects that are not described will be clearly understood by a person skilled in the art from the description below.

In order to accomplish the above object, a method of hashing a perceptual vector model based on a multi-scale curvature according to an embodiment of the present invention includes: generating a multi-dimensional feature coefficient matrix based on a multi curvature action energy distribution of a radius curvature, a turning angle curvature, and a Gaussian curvature for all polylines and polygon objects, and obtaining a multi-dimensional intermediate hash coefficient matrix by performing randomized mapping by using partial exponential bell polynomials for the generated multi-dimensional feature coefficient matrix with a random coefficient; and obtaining a final binary hash matrix by applying a Lloyd-Max quantizer to a real number type intermediate hash coefficient matrix, and enabling the multi-dimensional binary hash matrix to be hierarchically authenticated in a scale and a curvature type according to a security level of a vector model.

In order to accomplish the above object, a method of hashing a perceptual vector model based on a multi-scale curvature according to another embodiment of the present invention includes: generating a hash by using a hash function hash(M.R)=(H.θ) based on a multi-scale curvature; and authenticating a vector model by using a hash extraction function Dehash(M'.R.θ)=H'.

Herein, the hash function may includes: performing rectangular tiling; performing object re-sampling within a tile; calculating a multi curvature for each scale; and generating a binary hash by using a Lloyd-Max quantizer, and a multi-scale curvature hash coefficient based on a key.

In addition, the generating of the hash may includes: when performing rectangular tiling, in order to authenticate the vector model based on a hash for each tile in a vector model M with high accuracy and capacity, generating M={Mj} obtained by dividing the vector model M having a NH×NV size into a rectangular tile having a Nh×Nv size; and generating $M_j=\{p_i\}_{i=1}^{|M_j|}$ by extracting polygon and polyline objects among objects belonging to a number of layers within the divided tile, wherein when an entire size of the vector model M is NH×NV, and a ratio scale is 1/RS, the NH×NV size and an actual size of NH×NV may be calculated as $(NH \times RS \times 10^{-5}) \times (NV \times RS \times 10^{-5}) = NH \times NV \times RS^2 \times 10^{-10}[km^2]$ $N_H \times N_V \times RS^2 \times 10^{-10}[km^2]$.

In addition, in the generating of the hash, in order to ensure hash robustness when performing object sampling, objects may be re-sampled in the same interval δ when generating and extracting the hash, and then re-sampled virtual vertices are generated, when an original object $p=\{v_i\}_{i=1}^P$ is provided, a sample vertex for the same sampling interval δ may be $\hat{p}=\{v_k\}$, when a sample vertex vk is between vi−1 and vi, the sample vertex vk may become $v_k = v_{k-1} + \Delta d_k, \|\Delta d_k\| = \delta, v_k = (x_k, y_k) = (x_{k-1} + \Delta d_x, y_{k-1} + \Delta d_y)$; $f(x_k)=y_k$ by a cubic curve polynomial (cubic polynomial curve) expression corresponding to left/right four vertices $\{v_{k-2} \cdot v_{k-1} \cdot v_i \cdot v_{i-1}\}$ which are two previous re-sampled vertices $\{v_{k-2} \cdot v_{k-1}\}$ and two ensuing original vertices $\{v_i \cdot v_{i-1}\}$, herein, the sample vertex $v_k$ corresponding to two previous re-sampled vertices $\{v_{k-2} \cdot v_{k-1}\}$ and two ensuing original vertices $\{v_i \cdot v_{i+1}\}$ may be represented as $v_{k-2} < v_{k-1} < v_k < v_i < v_{i+1}$, and as a boarder tile of an object end point, when the sample vertex $v_k$ is before a last original vertex $v_n$, that is $v_{k-2} < v_{k-1} < v_k < v_n$, or after, that is $v_{k-2} < v_{k-1} < v_n < v_k$, the sample vertex $v_k$ may be determined by quadratic curve $C_k(v_k)$: $f(x) = a_0 + a_1 x + a_2 x^2 + a_3 x^3$ modeling that corresponds to three vertices of $\{v_{k-2} \cdot v_{k-1} \cdot v_n\}$.

A method of hashing a perceptual vector model based on a multi-scale curvatures according to an embodiment of the present invention can generate a hash being robust against various attacks and satisfying security by a random key and uniqueness performances by grouping polylines on a main layer within a vector data model, generating a group coefficient according to primary and secondary polyline curve curvature distributions, obtaining a feature coefficient by projecting the group coefficient onto a random pattern, and generating a final binary hash by performing binarization for the same.

In addition, in a method of hashing a perceptual vector model based on a multi-scale curvature according to another embodiment of the present invention, an error detection probability for an object attack such as object simplification, removing, copying, breaking, etc. can be lower than a conventional method by about $2 \times 10^{-5} \sim 2.8 \times 10^{-2}$, and a uniqueness probability is higher by about 0.014 than a conventional method when hash uniqueness is evaluated for three types of a model-key, a key, and a model.

In addition, in a method of hashing a perceptual vector model based on a multi-scale curvatures according to another embodiment of the present invention, an entropy can be higher by about 0.875~2.149 than an entropy of a conventional method when security performance is evaluated based on a differential entropy.

DETAILED DESCRIPTION

Hereinafter, an exemplary embodiment of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In the present invention, when any component "transmits" data or a signal to another component, the component may directly transmit the data or the signal to the other component, or may mean that data or signal may be transmitted to other components via at least one other component.

A method for hashing a perceptual vector model based on a multi-scale curvature purposes a method of hashing a vector model based on a multi-scale curvature which provides a hierarchical authentication and has excellent robust, uniqueness, and security performances. Main features of the purposed vector model hashing methods are as follows.

1) Re-sampled object curvature action energy: a method purposed in the present invention generates a hash based on a multi-scale curvature action energy of a radius curvature, a turning angle curvature, and Gaussian curvature, and which is invariant for a rigid motion, and robust against shape deformation. Object re-sampling is robust against changes in a number of vertices such as vector model simplification, vertex interpolation, etc.

2) Random key based scale-curvature multi-dimensional hash authentication: a method purposed in the present invention generates a multi-dimensional hash based on a curvature action energy on a spatial scale, and authenticates a model by hash comparison for each dimension. Herein, an arbitrary hash coefficient is calculated by performing randomized mapping curvature action energy for each scale with a random coefficient by using partial exponential bell polynomials. Randomized mapping of the curvature action energy increases both security and uniqueness performances. The multi-dimensional hash enables hierarchical authentication in a scale and a curvature type according to a security level of public and private vector.

Meanwhile, main symbols used in the present invention are as follows.

1) A Vector model M is configured with a number M of polylines and polygon objects p, 2) an object p is configured with a number |p| of vertices, that is $p=\{v_i\}_{i=1}^{P}$, a curve p that is $\overline{v_{l-1}v_l}$ is a group of line segments, and 3) the entire length of the object p is $\|p\|$, and a number of vertices which are elements of the object is |p|.

4) A re-sampled object of p is $\hat{p}$, and a curvature for each vertex on a spatial scale s is $t^s$. An average curvature energy per unit length of $\hat{p}_s$ is $\upsilon[\hat{p}_s]$.

5) When a vector model M and a random coefficient R are provided, by a hash function hash(M.R)=(H.θ), a binary hash H and a parameter θ are generated. When a transmitted vector model M', a parameter θ, and a random coefficient R are provided, by Dehash(M'.R.θ)=H', a binary hash H is extracted.

Figure 1:
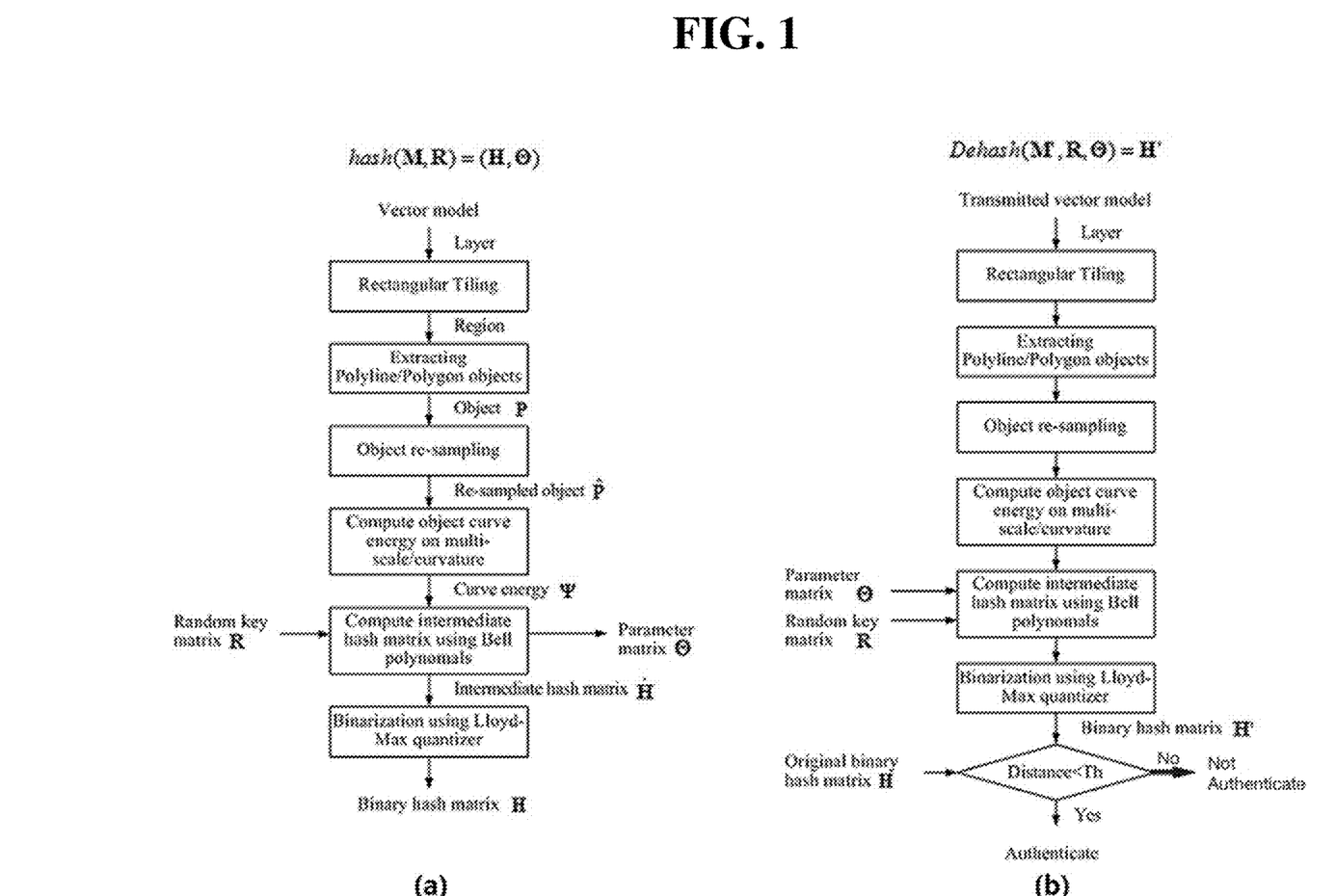
FIG. 1 is a view showing a process of generating a hash based on a multi-scale curvature (FIG. 1a), and authenticating a vector model by extracting a hash (FIG. 1b) which are purposed in a multi-scale curvature based perceptual vector model hashing method according to an embodiment of the present invention.

FIG. 1 is a view showing a process generating a hash based on a multi-scale (FIG. 1a) purposed in the present invention, and a process of authenticating a vector model by using a hash extraction process (FIG. 1b). Referring to FIG. 1, a method of hashing a perceptual vector based on multi-scale curvatures purposed in the present invention shows a process of authenticating a vector model by using generating a hash by a hash function hash(M.R)=(H.θ) based on a multi-scale curvature, and by using a hash extraction function Dehash(M'.R.θ)=H'. The purposed hash function is configured with: performing rectangular tiling, re-sampling object within the tile, calculating a multi-scale curvature for each scale, and generating a binary hash by using a key based multi-scale curvature hash coefficient and a Lloyd-Max quantizer.

Then, rectangular tiling will be described in detail.

First, when performing rectangular tiling, a vector map that is a vector model M with high capacity and accuracy includes main information for each tile such as roads, mountains, parks, buildings, etc., and is represented in a number of objects. Accordingly, in the vector model M, it is effective to authenticate the vector model M based on a hash for each tile.

In the purposed method, the vector model M having a NH×NV size is divided in rectangular $N_H \times N_V$ tiles which are M={$M_j$}, and polygon and polyline objects belonging to a number of layers within the divided tile are extracted, $M_j=\{p_i\}_{i=1}^{|M_j|}$. Herein, when the entire size of the vector model M is NH×NV, and a ratio scale is 1/RS, actual areas of NH×NV and $N_H \times N_V$ are as Formula 1 below.

$$(NH \times RS \times 10^{-5}) \times (NV \times RS \times 10^{-5}) = NH \times NV \times RS^2 \times 10^{-10} [km^2]$$

$$N_h \times N_v \times RS^2 \times 10^{-10} [km^2] \qquad \text{[formula 1]}$$

Figure 2:
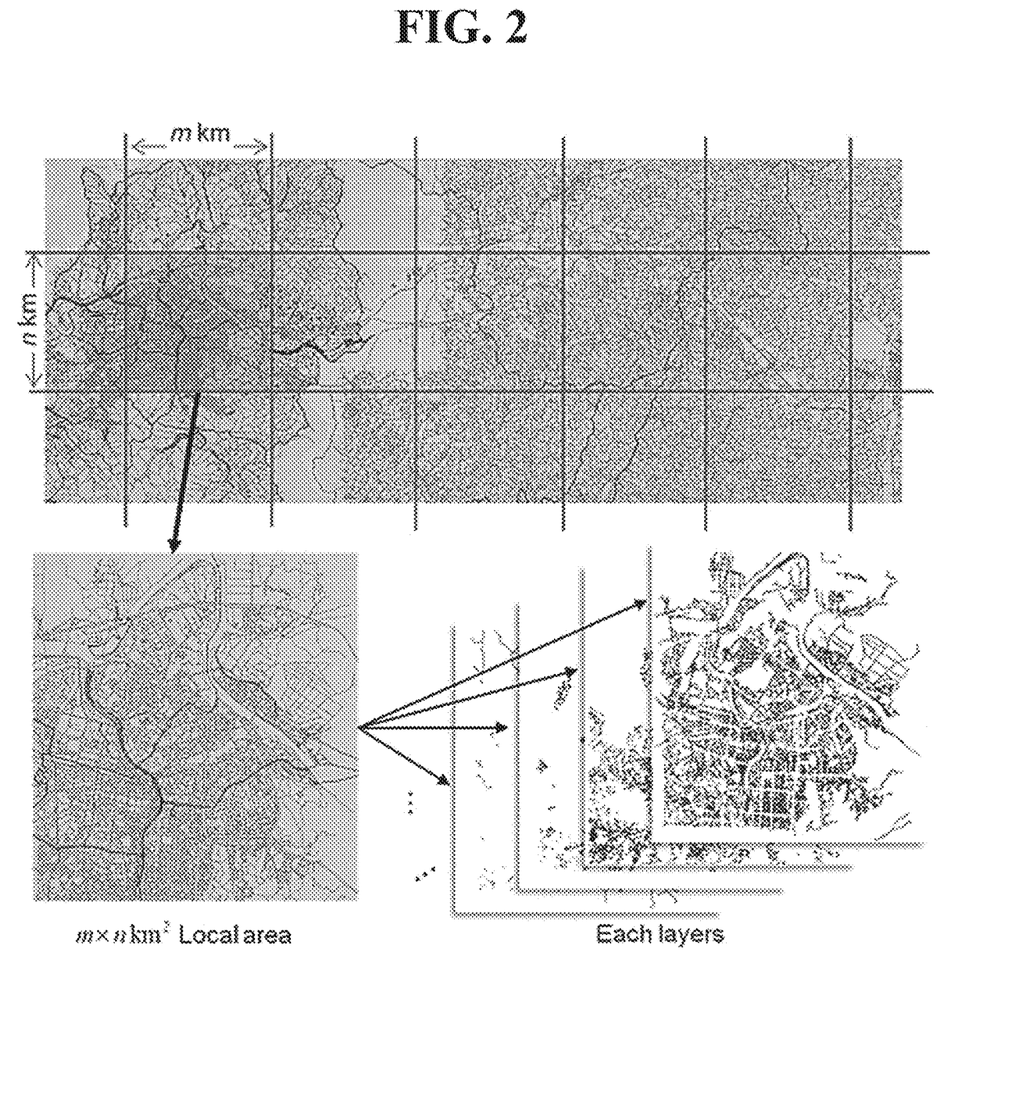
FIG. 2 is a view showing an example of performing rectangular tiling and separating a layer within the tile, and a vector map having a transverse Mercator (TM) coordinate system in the multi-scale curvature based perceptual vector model hashing method according to an embodiment of the present invention.

For example, in a vector map in which ratio scales are 1/10,000, and 1/100,000, the divided tiles respectively have an area of $N_H N_V 10^{-2}[km^2], N_H N_V[km^2]$. FIG. 2 is a view showing an example of performing rectangular tiling and separating into layers within the divided tile in a vector map having a transverse Mercator (TM) coordinate system.

Hereinafter, generating a hash of the divided tile $M_j=\{p_i\}_{i=1}^{M_j}$ will be described.

Figure 3:
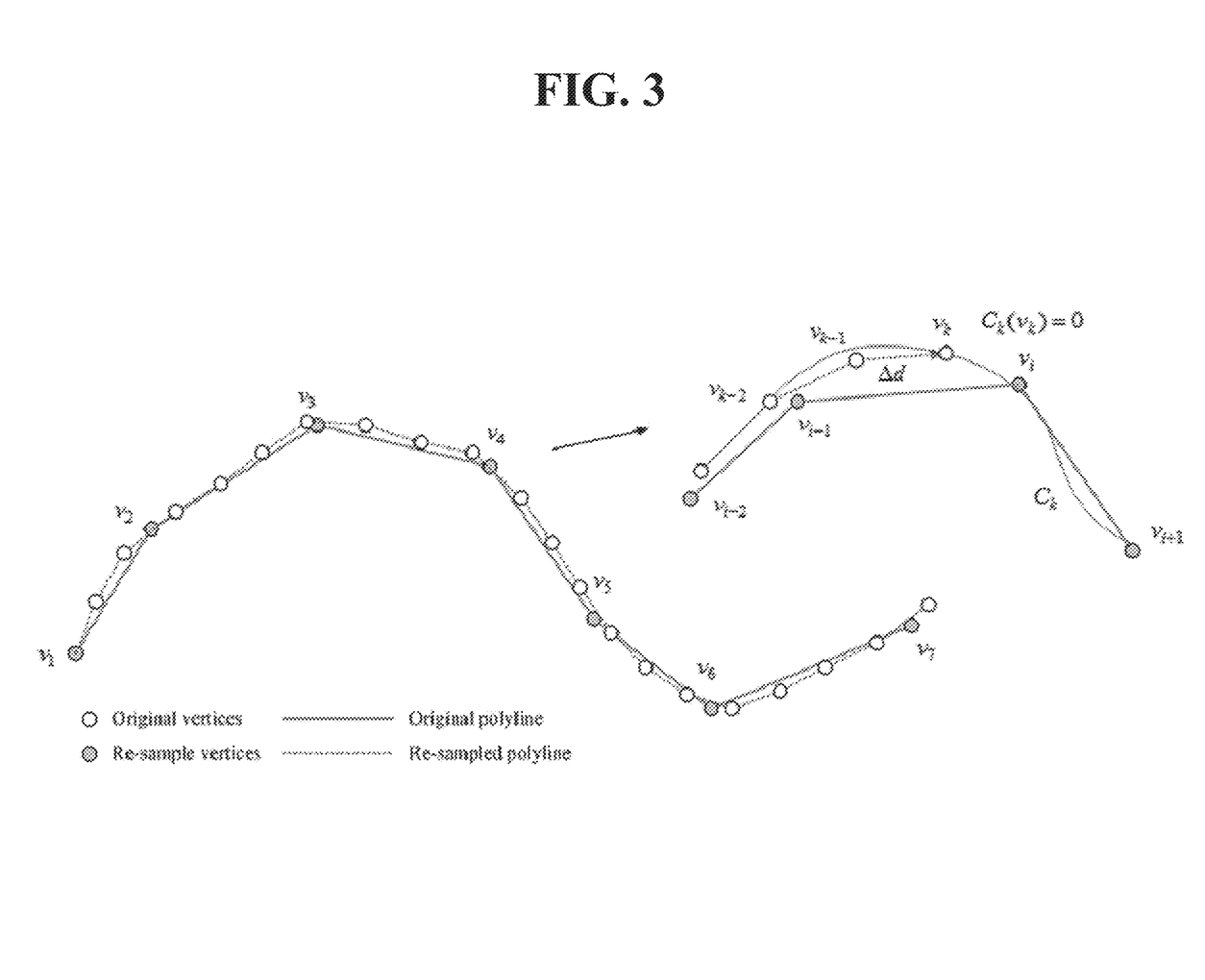
FIG. 3 is a view showing re-sampling of an arbitrary object in the multi-scale curvature based perceptual vector model hashing method according to an embodiment of the present invention.

First, object sampling will be described. FIG. 3 is a view illustrating re-sampling of an arbitrary object.

While a geometric shape of the vector model is maintained, a number of vertices may be changed by polyline and polygon simplification or interpolation, or may be changed in positions by vertex random sampling. In the purposed method, for robustness of a hash, in generating and extracting a hash, objects are resampled in the same interval δ, and re-sampled virtual vertices are generated.

When an original object $p=\{v_i\}_{i=1}^{P}$ is provided, a sample vertex for sampling in the same interval δ is $\hat{p}=\{v_k\}$. When a sample vertex $v_k$ is between $v_{i-1}$ and $v_i$, as shown in FIG. 3, by a cubic curve polynomial expression (cubic polynomial curve) $C_k(v_k):f(x)=a_0+a_1x+a_2x^2+a_3x^3$ corresponding to four vertices $\{v_{k-2} \cdot v_{k-1} \cdot v_i \cdot v_{i-1}\}$ which are two previous resampled vertices $\{v_{k-2} \cdot v_{k-1}\}$ and two ensuing original vertices $\{v_i \cdot v_{i-1}\}$, $v_k$ may be as Formula 2 below.

$$v_k = v_{k-1} + \Delta d_k, \|\Delta d_k\| = \delta, \quad \text{[Formula 2]}$$
$$v_k = (x_k, y_k) = (x_{k-1} + \Delta d_x, y_{k-1} + \Delta d_y);$$
$$f(x_k) = y_k$$

Herein, $v_k$ corresponding to two previous re-sampled vertices $\{v_{k-2}, v_{k-1}\}$ and two ensuing original vertices $\{v_i, v_{i+1}\}$ is represented as $v_{k-2} < v_{k-1} < v_k < v_i < v_{i+1}$. As a boarder tile of an object end point, when $v_k$ is before the last original vertex $v_n$, that is $v_{k-2} < v_{k-1} < v_k < v_n$, or after, that is $v_{k-2} < v_{k-1} < v_n < v_k$, $v_k$ is determined by quadratic curve $C_k(v_k): f(x) = a_0 + a_1 x + a_2 x^2 + a_3 x^3$ modeling that corresponds to three vertices of $\{v_{k-2}, v_{k-1}, v_n\}$.

Describing a cubic polynomial coefficient, parameters of a cubic curve are determined by a cubic polynomial regression model. In other words, in Formula 3 below which is a cubic polynomial expression, when a coefficient vector is A and a random error vector is E, a response vector T may be represented as Formula 4 below.

$$C_k(v_k); y = f(x), \quad \text{[Formula 3]}$$
$$y_k = a_0 + a_1 x + a_2 x^2 + a_3 x^3 + \varepsilon_k$$
$$\text{for}$$
$$\{v_{k-2}, v_{k-1}, v_i, v_{i+1}\}$$

$$Y = XA + E, \quad \text{[Formula 4]}$$
$$\begin{bmatrix} y_{k-2} \\ y_{k-1} \\ y_i \\ y_{i+1} \end{bmatrix} = \begin{bmatrix} 1 & x_{k-2} & x_{k-2}^2 & x_{k-2}^3 \\ 1 & x_{k-1} & x_{k-1}^2 & x_{k-1}^3 \\ 1 & x_i & x_i^2 & x_i^3 \\ 1 & x_{i+1} & x_{i+1}^2 & x_{i+1}^3 \end{bmatrix} \begin{bmatrix} a_0 \\ a_1 \\ a_2 \\ a_3 \end{bmatrix} + \begin{bmatrix} \epsilon_0 \\ \epsilon_1 \\ \epsilon_2 \\ \epsilon_3 \end{bmatrix}$$

Polynomial regression coefficients estimated by using an ordinary least squares estimation are as Formula 5 below.

$$\hat{A} = (X^T X)^{-1} X^T Y \quad \text{[Formula 5]}$$

Then, describing a sampling interval $\delta$, the sampling interval is determined by a length distribution of main objects $p^*$ having high ranking lengths among the entire objects.

Setting an object length as a probability variable $L = \|p^*\|$, when a maximum length is $L_{max} = \max\{\|p^*\|\}$, a cumulative distribution function of L is $F_L(l) = \Pr(L \le l)$, and an inverse function thereof is $F_L^{-1}(\Pr(L \le i)) = l$. Herein, a variable l' corresponding to an inflection point $F_L''(l') = 0$ of $F_L(l)$ may be calculated as Formula 6 below.

$$l' = F''^{-1}_L(0) \quad \text{[Formula 6]}$$

Figure 4:
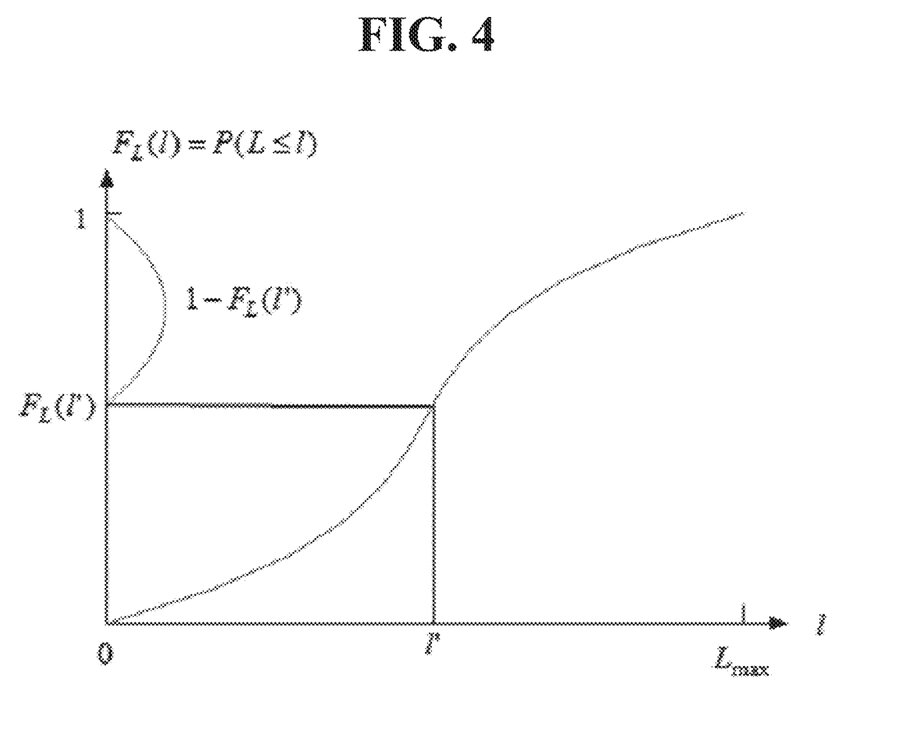
FIG. 4 is a view showing an example of a threshold variable l' required when determining a primary object in the multi-scale curvature based perceptual vector model hashing method according to an embodiment of the present invention.

Herein, the main objects P* are objects corresponding to $\|p^*\| \ge l'$, and the primary objects have a ratio of $1 - F_L(l') = 1 - \Pr(L \le l') = \Pr(l' < L \le L_{max})$. FIG. 4 is a view showing an example of a threshold variable of l' required when determining a main object.

In other words, FIG. 4 is a view showing a graph of a threshold variable setting example required when determining a main object on a cumulative distribution of vector model objects.

When a group of main objects $p^*$ is P*, an average length $\|\overline{P^*}\|$ of $p^*$ is as Formula 7 below.

$$\|\overline{P^*}\| = \frac{1}{\|P^*\|} \sum_{i=1}^{|p^*|} \|p_i^*\|, \text{ where } \|p^*\| = \sum_{i=1}^{|p^*|} \|v_i - v_{i-1}\| \quad \text{[Formula 7]}$$

|P*| is cardinality of a group P*, and represents a number of main objects p* which are elements. The sampling interval δ is determined by Formula 8 below by providing a minimum length $\min\{\|\overrightarrow{v_l v_{l-1}}\| \forall p^* \in P^*\}$ as ½ among all segments of main objects, and an average length of the main objects $$\delta = \frac{\min\{\|\overrightarrow{v_l v_{l-1}}\| \forall p^* \in P^*\}}{2\|\overline{P^*}\|} \quad \text{[Formula 8]}$$

A final re-sampled object is $\hat{p} = \{v_k | k \in [1.|\hat{p}|]\}$, a length thereof $\|\hat{p}\|$ is as Formula 9 below, and a number of vertices of re-sampled objects is as Formula 10 below.

$$\|p\| = \sum_{i=1}^{|p|} \|v_i - v_{i-1}\| < \|\hat{p}\| = \sum_{k=1}^{|\hat{p}|} \|v_k - v_{k-1}\| \quad \text{[Formula 9]}$$

$$|\hat{p}| = \left\lceil \frac{\|p\|}{\delta} \right\rceil \quad \text{[Formula 10]}$$

Then, a multi-scale curvature and curvature energy will be described, a multi-scale curvature is a sampling interval $$\frac{\delta}{s}$$

for each spatial scale s in a re-sampled object $\hat{p} = \{v_k | k \in [1.|\hat{p}|]\}$, and the re-sampled object is defined as Formula 11 below.

$$\hat{p}^s = \{v_{k/s} | k \in [1 \cdot n_s]\} \text{ where } n_s = \lceil |\hat{p}^s| \times s \rceil \, s \in [1, \tfrac{1}{2}, \tfrac{1}{3}, \tfrac{1}{4}, \ldots] \quad \text{[Formula 11]}$$

Figure 5:
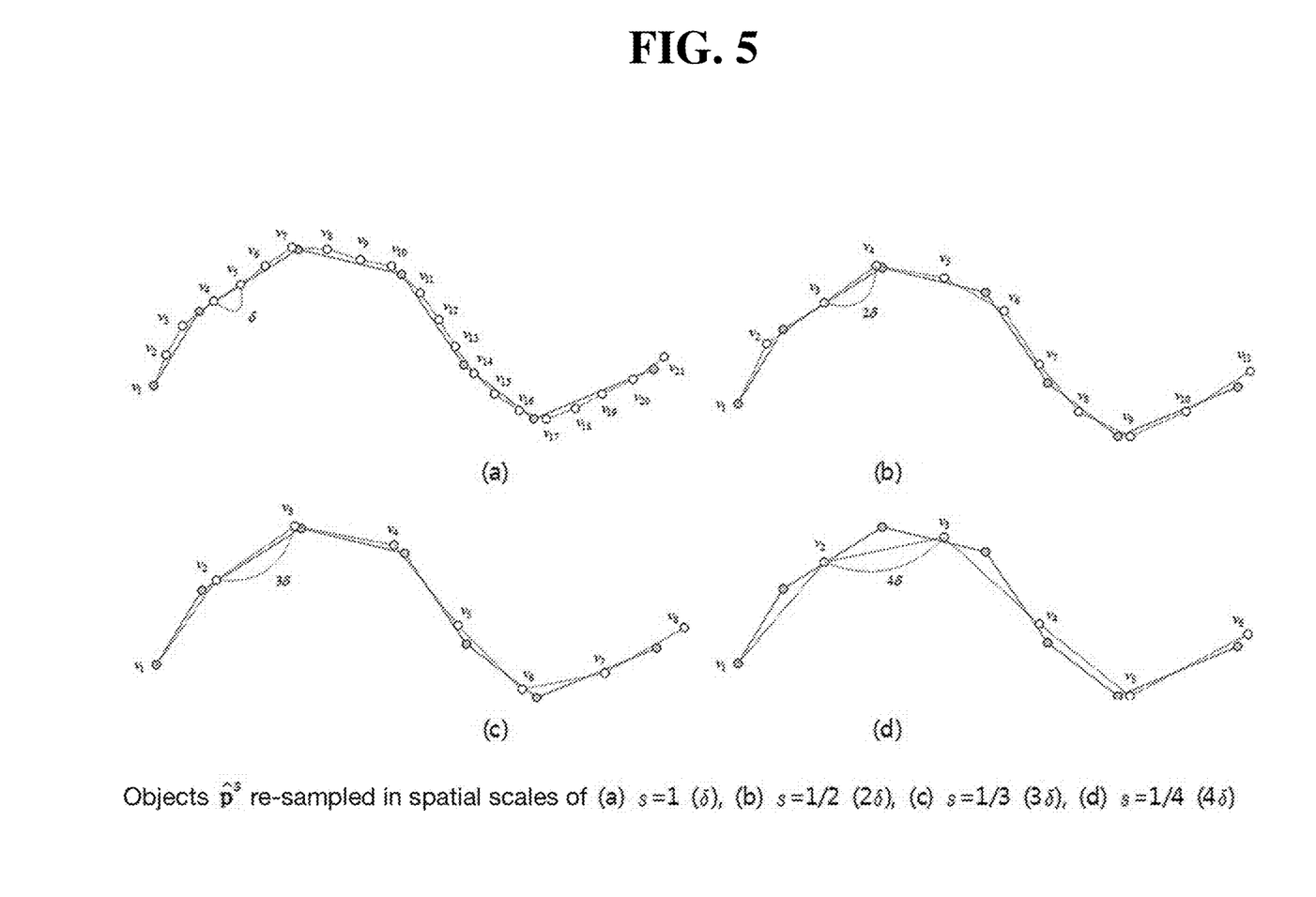
FIG. 5 is a view showing re-sampling is performed when a spatial scale is s=1 and an interval is δ, and when a spatial scale is s=¼ and an interval is 4δ in the multi-scale curvature based perceptual vector model hashing method according to an embodiment of the present invention.

As shown FIG. 5, in a spatial scale of s=1, re-sampling is performed in an interval δ, when s=¼, re-sampling is performed in a 4δ interval. In other words, when the spatial scale s becomes large, the object is precisely represented, and when s becomes small, the object is proximately represented.

In the purposed method, for all vertices of a re-sampled object $\hat{p}^s$ for each scale, a multi-scale curvature $[\tau_g^s(k) \cdot \tau_o^s(k) k \cdot \tau_a^s(k)]$ of a Gaussian curvature $\tau_g^s(k)$, a radius curvature $\tau_g^s(k)$, and a turning angle curvature $\tau_a^s(k)$ may be calculated by Formulas 12 to 14 below.

$$\tau_g^s(k) = \frac{(\hat{p}^s * G'_\sigma)_x(k)(\hat{p}^s * G''_\sigma)_y(k) - (\hat{p}^s * G''_\sigma)_x(k)(\hat{p}^s * G'_\sigma)_y(k)}{\|(\hat{p}^s * G'_\sigma)(k)\|^3} \quad \text{[Formula 12]}$$

where $$G_{\sigma=1}\left[\frac{3}{11}, \frac{5}{11}, \frac{3}{11}\right]$$

$$\tau_r^s(k) = \frac{1}{\gamma^2(k)} \quad \text{[Formula 13]}$$

where y(k) is the radius of circumcircle on $(v_{k/s-1}, v_{k/s}, v_{k/s+1})$ $$\Gamma_a^s(k) = \left| \frac{2|\angle(\overrightarrow{v_{k-1} v_k}, \overrightarrow{v_k v_{k+1}})|}{\|\overrightarrow{v_{k-1} v_k}\| + \|\overrightarrow{v_k v_{k+1}}\|} \right| \quad \text{[Formula 14]}$$

where $$|L(\overrightarrow{v_{k-1}v_k}, \overrightarrow{v_k v_{k+1}})| = \cos^{-1}\left\langle \frac{\overrightarrow{v_{k-1}v_k}}{\|\overrightarrow{v_{k-1}v_k}\|}, \frac{\overrightarrow{v_k v_{k+1}}}{\|\overrightarrow{v_k v_{k+1}}\|} \right\rangle$$

Then, the curvature energy will be described. An re-sampled object of an arbitrary object $\hat{p}_I$ for each scale is $\hat{p}_I = \hat{p}_I^1 \cdot \hat{p}_I^{1/2} \cdot \hat{p}_I^{1/3} \cdot \hat{p}_I^{1/4}$, and curvature energy $v[\hat{p}_i^s]$ per unit length thereof is defined as Formula 15 below.

$$\psi[\hat{p}_i^s] = \frac{1}{\|\hat{p}_i^s\|} \sum_{k=1}^{n_s} \tau^2\left(\frac{k}{s}\right) \|v_{k/s} - v_{k/s-1}\|, \quad \text{[Formula 15]}$$

where $$\|\hat{p}_i^s\| = \sum_{k=1}^{n_s} \|v_{k/s} - v_{k/s-1}\|,$$

for $s \in \left[1, \frac{1}{2}, \frac{1}{3}, \frac{1}{4}, \ldots\right]$

Herein, $$\tau\left(\frac{k}{s}\right)$$

represents a curvature at a position $$\frac{k}{s}.$$

In the present invention, a curvature energy $\psi[\hat{p}_i^s]$ for each scale is simply marked as $\psi_i^s$. An average curvature energy $\psi_i$ for each curvature and scale or an object $\hat{p}_i$ is represented as a matrix having a scales×curvatures size as Formula 16 below.

$$\hat{p}_i \rightarrow \psi_i = \begin{bmatrix} v_{g,i}^1 & v_{o,i}^1 & v_{a,i}^1 \\ v_{g,i}^{1/2} & v_{o,i}^{1/2} & v_{a,i}^{1/2} \\ v_{g,i}^{1/3} & v_{o,i}^{1/3} & v_{a,i}^{1/3} \\ v_{g,i}^{1/4} & v_{o,i}^{1/4} & v_{a,i}^{1/4} \\ \vdots & \vdots & \vdots \end{bmatrix} \quad \text{[Formula 16]}$$

In the present invention, a scale s is defined as a scale of $s \in$ scales=$1 \cdot \frac{1}{2} \cdot \frac{1}{3} \cdot \frac{1}{4}$ . . . . . Multi-scale curvatures of a Gaussian curvature, a radius curvature, a turning angle are simply marked as curvature=[g, a, o].

Then, an intermediate hash matrix based on a curvature energy will be described.

First, curvature energy clustering will be described. A curvature energy $\psi$ of unit per length for each scale and curvature of all re-sampled objects $M_j = \{\hat{p}_i\}_{i=1}^{|M_j|}$ within the divided tile $M_j$ is a matrix having a scales×curvatures×$M_j$ size as Formula 7 below.

$$\psi = \{\psi_i\}_{i=1}^{|M_j|} \text{ where } \psi_i = \{\psi_{curvature,i}^s | \forall s \in [1, \frac{1}{2}, \frac{1}{3}, \ldots], \text{curvature} \in [g,o,a]\}, \quad \text{[Formula 17]}$$

where g: Direct Gaussian Curvature, o: Curvature Radius, a: Turning Angle Curvature In the purposed method, as an intermediate hash of the divided tile $M_j$, as shown in FIG. 6, by using a curvature energy matrix having a scales×curvatures×$|M_j|$ size, an intermediate matrix (hash matrix) having a scales×curvatures size is defined.

Figure 6:
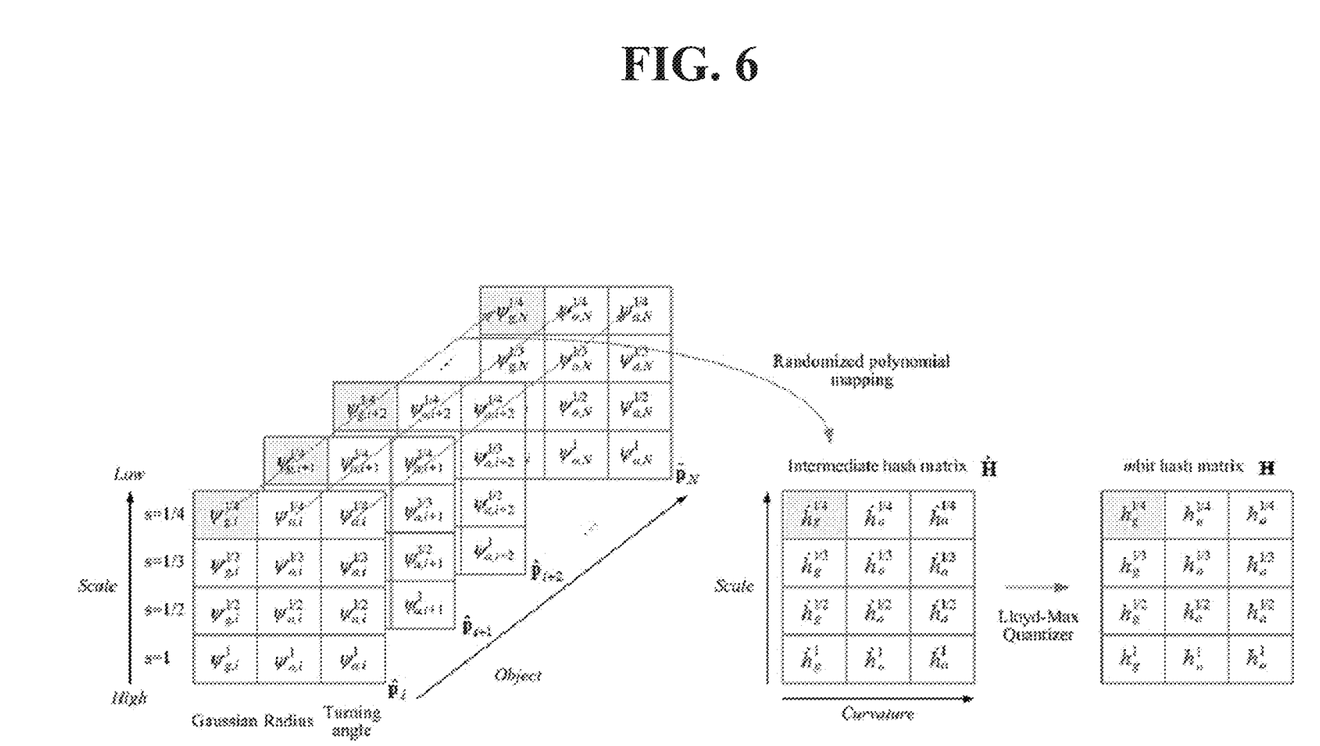
FIG. 6 is a view showing a process of generating an intermediate hash matrix having a size obtained by using an object curvature energy for scales×curvatures×objects and partial exponential bell polynomials, and generating a binary hash matrix of m bits by using a Llyoyd-Max quantizer in the multi-scale curvature based perceptual vector model hashing method according to an embodiment of the present invention.

In other words, FIG. 6 is a view showing a process of generating an intermediate hash matrix having a size obtained by an object curvature energy for each scales×curvatures×objects and partial exponential bell polynomials, and generating a binary hash matrix of m bits by using a Llyoyd-Max quantizer.

Meanwhile, when an object curvature energy $\psi_{curvature}^s$ for an arbitrary scale s and a curvature type curvature is as Formula 18 below, object curvature energies are clustered in a number of groups based on Gaussian mixture model (GMM)—expectation maximization (EM).

$$\psi_{curvature}^s = \{\psi_{curvature,1}^s, \psi_{curvature,2}^s, \ldots, \psi_{curvature,|M_j|}^s\} \quad \text{[Formula 18]}$$

In other words, after randomly selecting a number $N_B$ of initial variables $\theta_n^{(0)} = (\omega_n^{(0)} \cdot \mu_n^{(0)} \cdot \Sigma_n^{(0)})$, $n \in [1, N_B]$, a number $N_B$ of groups based on GMM is obtained by calculating a variable $\theta_n = (\omega_n \cdot \mu_n \cdot \Sigma_n)$, $n \in [1, N_B]$ having a maximum log-likelihood of $\psi_{curvature}^s$ by applying E-step and M-step.

$$G_{curvature,k}^s = \quad \text{[Formula 19]}$$
$$\{\psi_{curvature,i}^s : Pr(\psi_{curvature,i}^s | \phi_k) > (\psi_{curvature,i}^s | \phi_{k'}),$$
$$\forall k' \neq k, \text{ and, } k' \in [1, N_B]\}$$

Herein, a parameter group $\theta_{curvature}^s = \{\theta_{curvature,k}^s = (\omega_{curvature,k}^s \mu_{curvature,k}^s \Sigma_{curvature,k}^s)) | k \in [1 \cdot N_B]\}$, is information required for extracting a hash with a random coefficient key.

An intermediate hash matrix will be described. Similar to a number of object curvature energies for a scale and for each curvature type, a hash key R having a scale×curvature×$N_B$ size with random coefficient is obtained by Formula 20 below.

$$R = \quad \text{[Formula 20]}$$
$$\left\{ r_{curvature}^s \mid \forall s \in \left[1, \frac{1}{2}, \frac{1}{3}, \ldots\right], \text{curvature} \in [g, o, a]\right\}$$

where $$r_{curvature}^s = \{r_{curvature}^s | k \in [1, N_B]\}$$

Figure 7:
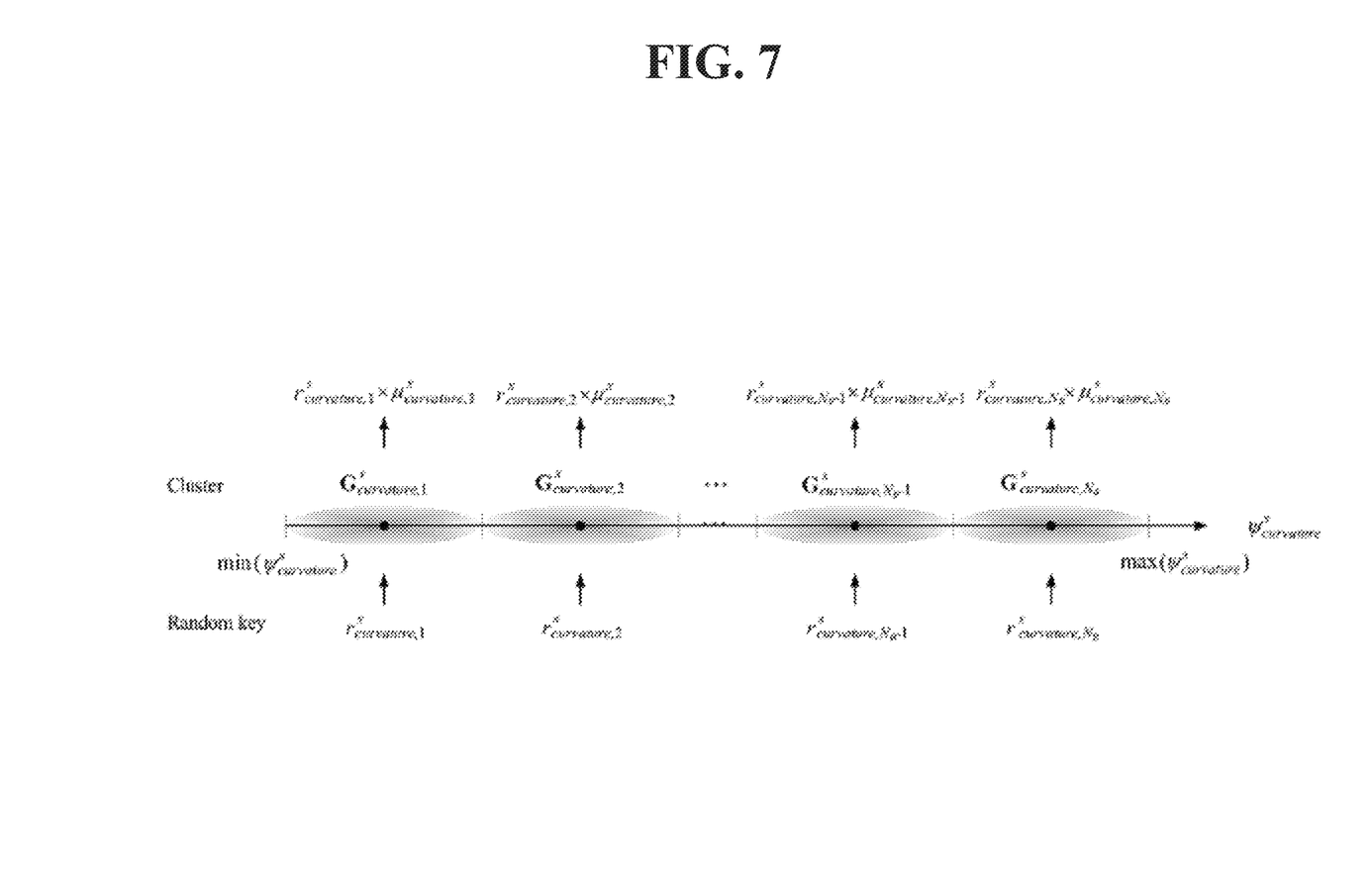
FIG. 7 is a view showing a process of generating an intermediate hash coefficient by using a number of group coefficients of object curvature energies and a random coefficient in the multi-scale curvature based perceptual vector model hashing method according to an embodiment of the present invention.

A group coefficient $b_{curvature,k}^s$ of an arbitrary group $G_{curvature,k}^s$ is defined as Formula 21 below by the product of an average curvature energy $\mu_{curvature,i}^s$ and a random coefficient $r_{curvature,k}^s$ thereof as shown in FIG. 7.

Meanwhile, FIG. 7 is a view showing a process of generating an intermediate hash coefficient by using a number of groups of object curvature energies and a random coefficient.

$$b_{curvature,k}^s = r_{curvature,k}^s \times \mu_{curvature,k}^s \text{ for } k \in [1, N_B] \quad \text{[Formula 21]}$$

An intermediate hash coefficient $h'_{curvature}^s$ curvature on an arbitrary scale and a curvature (s,curvature) is obtained by using partial exponential bell polynomials of a group coefficient $\{b_{curvature,k}^s\}_{k=1}^{N_B}$ of an average curvature energy, which is $B_{n,m}(b_1, b_2, \ldots, b_{N_B})$. In other words, $h'_{curvature}^s$ may be simply defined as Formula 22 below.

$$h'^{s}_{curvature} = B_{n,m}(b^{s}_{curvature,1}, b^{s}_{curvature,2}, \ldots, b^{s}_{curvature,N_B}) = \quad \text{[Formula 22]}$$

$$\sum \frac{n!}{j_1! j_2! \ldots j_{n-m+1}!} \left(\frac{b^{s}_{curvature,1}}{1!}\right)^{j_1}$$

$$\left(\frac{b^{s}_{curvature,k}}{2!}\right)^{j_2} \ldots \left(\frac{b^{s}_{curvature,k}}{(n-m+1)!}\right)^{j_{n-m+1}}$$

In addition, when $n-m-1=N_B$, $h'^{s}_{curvature}$ may be schematically represented as Formula 23 below.

$$h'^{s}_{curvature} = n! \sum \left(\prod_{k=1}^{N_B} \frac{1}{j_k!} \left(\frac{b^{s}_{curvature,k}}{k!}\right)^{j_k}\right) \quad \text{[Formula 23]}$$

Herein, in the summation term, $j_1, j_2, \ldots, j_{N_B}$ are negative integers satisfying two conditions of Formula 24 below.

$$j_1 + j_2 + \ldots + j_{N_B} = m$$

$$j_1 + 2j_2 + 3j_3 + \ldots + N_B j_{N_B} = n \quad \text{[Formula 24]}$$

In the purposed method, n set as $n = N_B + 1$, $m = 2$, and a group coefficient is set to be $N_B = 10$. Herein, partial exponential bell polynomials $B_{11,2}(b_1, b_2, \ldots, b_{N_B})$ are as Formula 25 below.

$$B_{11,2}(b_1, b_2, \ldots, b_{10}) = \quad \text{[Formula 25]}$$

$$\sum \frac{11!}{j_1! j_2! \ldots j_{10}!} \left(\frac{b_1}{1!}\right)^{j_1} \left(\frac{b_2}{2!}\right)^{j_2} \ldots \left(\frac{b_{10}}{10!}\right)^{j_{10}} =$$

$$11! \left(\frac{b_1}{1!}\frac{b_{10}}{10!} + \frac{b_2}{2!}\frac{b_9}{9!} + \frac{b_3}{3!}\frac{b_8}{8!} + \frac{b_4}{4!}\frac{b_7}{7!} + \frac{b_5}{5!}\frac{b_6}{6!}\right) =$$

$$11 b_1 b_{10} + 55 b_2 b_9 + 165 b_3 b_8 + 330 b_4 b_7 + 462 b_5 b_6$$

By the above polynomial expression, an intermediate hash matrix $\hat{H}$ having a scales×curvatures size for all scales and curvature types is obtained as Formula 26 below.

$$H' = \begin{bmatrix} h'^{1}_{g} & h'^{1}_{0} & h'^{1}_{a} \\ h'^{1/2}_{g} & h'^{1/2}_{0} & h'^{1/2}_{a} \\ h'^{1/3}_{g} & h'^{1/3}_{0} & h'^{1/3}_{a} \\ h'^{1/4}_{g} & h'^{1/4}_{0} & h'^{1/4}_{a} \\ \vdots & \vdots & \vdots \end{bmatrix} \quad \text{[Formula 26]}$$

Then, a binary hash matrix based on a Lloyd-Max quantizer will be described.

A real number type coefficient $\hat{h}_{curvature}^{s}$ of an intermediate hash matrix $\hat{H}$ is binarized to a hash coefficient $h_{curvature}^{s}$ having mbit by using an mbit=($2^m$-level) Lloyd-Max Quantizer.

Herein, two variables of the Lloyd-Max quantizer which are bin boundaries L and a replacement value (replacement value) $z=(\tilde{~}_1 \cdot \tilde{~}_2 \cdot \ldots \tilde{~}_2 y)$ are determined by a test model and sample intermediate hash matrices $\{\hat{H}^{(t)}\}_{t=1}^{1000}$ for 1000 keys.

When a coefficient group $h_{curvature}^{s} = \{h_{curvature}^{s(t)}\}_{t=1}^{1000}$ on an arbitrary (s,curvature) of the sample intermediate hash matrix $\{\hat{H}^{(t)}\}_{t=1}^{1000}$ is provided, Bin boundaries L are $L=(L_1, L_2, \ldots, L_{2^m-1})$; $\min(\hat{h}_{curvature}^{s}) < L_1 < L_2 < \ldots L_{2^m-1} < \max(\hat{h}_{curvature}^{s})$, and a quantization function for L is as Formula 27 below.

$$q(\hat{h}_{curvature}^{s})z_j, \text{ for } \hat{h}_{curvature}^{s} \in [L_j, L_{j+1}] \quad \text{[Formula 27]}$$

Herein, in order to minimize a quantization error E(L,z), L and z are obtained by Formula 28 below.

$$E(L, z) = \sum_{i=1}^{2^m} |q(h'^{s}_{curvature}) - h'^{s}_{curvature}|^2 = \quad \text{[Formula 28]}$$

$$\sum_{j=1}^{2^m} \sum_{h'^{s}_{curvature} \in [L_j, L_{j+1}]} (h'^{s}_{curvature} - z_j)^2$$

In other words, in order to be a partial derivative for E(L,z) being 0, L and z are calculated as Formulas 29 and 30 below, then, the above calculation is repeatedly performed until there are no changes in $L_1^{new}$ and $L_{2^m+1}^{new}$ compared to a previous result.

$$\frac{\delta E}{\delta z_j} = \sum_{h'^{s}_{curvature} \in [L_j, L_{j+1}]} 2(h'^{s}_{curvature} - z_j) = \quad \text{[Formula 29]}$$

$$Q z_j^{new} = \text{average } \{h'^{s}_{curvature} \mid h'^{s}_{curvature} \in [L_j, L_{j+1}]\}$$

$$\frac{\delta E}{\delta L_j} = 0, L_j^{new} = \frac{1}{2}(z_{j-1}^{new} + z_j^{new}), j = 2, 3, \ldots, 2^m \quad \text{[Formula 30]}$$

After obtaining a quantization parameter $Q=(L_{curvature}^{s} z_{curvature}^{s})$ for all scales and curvatures by the above process, a final binary hash matrix H is generated by using mbit quantizer for the intermediate hash matrix $\hat{H}$ having a $Q=(L_{curvature}^{s}, Z_{curvature}^{s})$ size as the Formula 31 below.

$$Q(\hat{H})=H, \text{ where } q(\hat{h}_{curvature}^{s} L_{curvature}^{s} z_{curvature}^{s})= h_{curvature}^{s} \quad \text{[Formula 31]}$$

Then, a hash authentication will be described.

A hash data base HDB of vector model is configured as Table 1 below with quantization parameter $Q_{nj}$ and hashes $H_{nj}$ which are generated when a vector model $M_n$, and a random key $R_{nj}$ are provided while generating a hash. In $(M_i, R_{ij}, Q_{ij}, H_{ij})$, a random key $R_{ij}$ is generated by a user, and is combined with a model $M_i$ so that a parameter and a hash are generated.

TABLE 1

| Vector model | Key matrix | Parameter matrix (mbit quantization) | Hash matrix |
|---|---|---|---|
| $M_1$ | $R_{11}$ | $Q_{11} = (L_{11}, z_{11})$ | $H_{11}$ |
|  | $R_{12}$ | $Q_{12} = (L_{12}, z_{12})$ | $H_{12}$ |
|  | . | . | . |
|  | . | . | . |
|  | . | . | . |
| $M_2$ | $R_{21}$ | $Q_{21} = (L_{21}, z_{21})$ | $H_{21}$ |
|  | $R_{22}$ | $Q_{11} = (L_{22}, z_{22})$ | $H_{22}$ |
|  | . | . | . |
|  | . | . | . |
|  | . | . | . |
| . | | | |
| . | | | |
| . | | | |

TABLE 1-continued

| Vector model | Key matrix | Parameter matrix (mbit quantization) | Hash matrix |
|---|---|---|---|
| $M_n$ | $R_{n1}$ | $Q_{n1} = (L_{n1}, z_{n1})$ | $H_{n1}$ |
|  | $R_{n2}$ | $Q_{n2} = (L_{n2}, z_{n2})$ | $H_{n2}$ |
|  | . | . | . |
|  | . | . | . |
|  | . | . | . |

In authenticating an arbitrary model $M_n$ and a user key $R_{nj}$, a quantization parameter $Q_{nj}$ and a hash $H_{ij}$ for $M_n$ and $R_{nj}$ are found from an HDB, and a hash $H_{nj}$=Hash($M_n,Q_{nj}$: $R_{nj}$) is extracted by using the parameter $Q_{nj}$.

When a normalized Hamming distance difference between the extracted hash $H'_{nj}$ and a primitive hash $H_{nj}$ is $d(H_{nj},H'_{nj})$<th, $M_n$ and $K_{nj}$ are authenticated. The normalized Hamming distance difference is as Formula 32 below.

$$d(H, H') = \frac{1}{\text{scales} \times \text{curvatures}} \sum_{s=1}^{\text{scales}} \sum_{\text{curvatures}=g,o,a} |h^s_{\text{curvature}} - h'^s_{\text{curvature}}| \quad \text{[Formula 32]}$$

Then, an authentication threshold th will be described.

A threshold is determined by using a hypothesis experiment based on a receiver operation characteristic (ROC). In the hypothesis experiment, a normalized Hamming distance difference between hashes generated by 1000 keys on a vector data model and hashes extracted from attacked models thereof, and a true positive rate (TP) and a false positive rate (FP) are respectively measured by adjusting a threshold th having a range of [0, 0.5] in a unit of 0.05. A TP probability TP is a probability where a hash H' of an attacked model M' is authenticated to an original model $M_k$, and a probability FP is a probability wherein the hash H' of the attacked model M' is authenticated to another model $M_k$ (Refer to Formula 33 below).

$$p_{TP}=Pr[d(H,H')<th]$$

$$p_{FP}=Pr[d(H_k,H')<th] \quad \text{[formula 33]}$$

Figure 8:
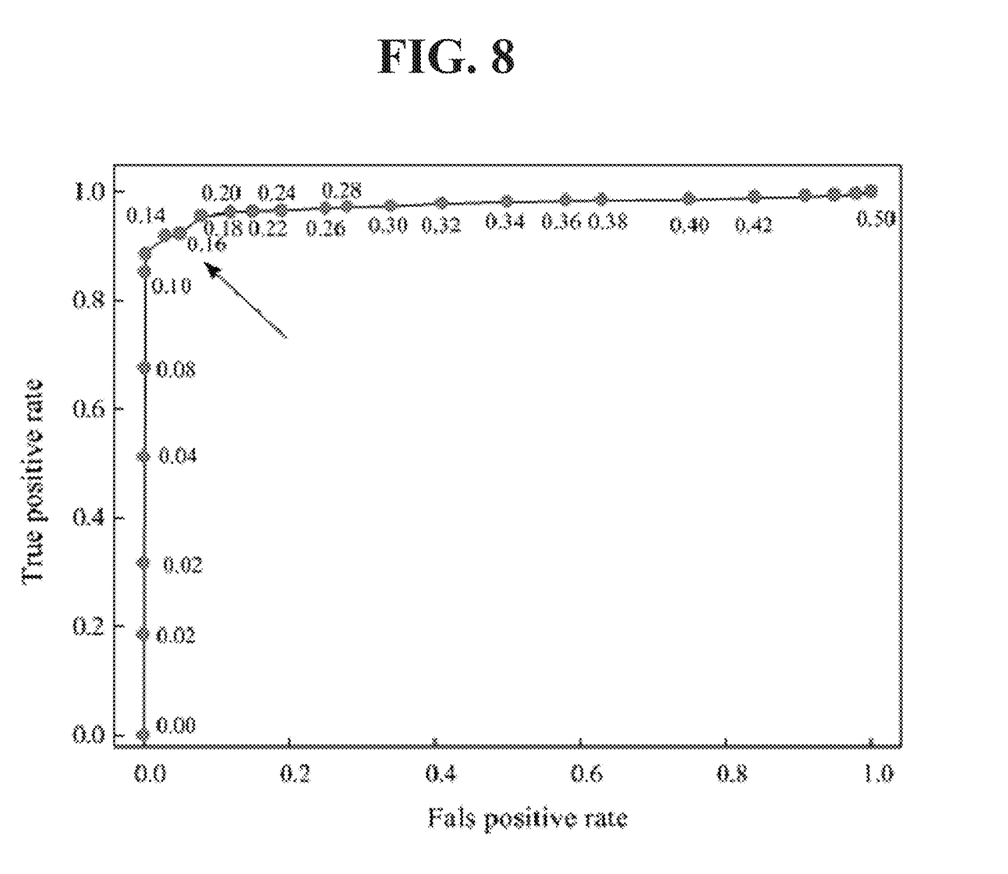
FIG. 8 is a view showing an ROC curve of a hash authentication threshold in the multi-scale curvature based perceptual vector model hashing method according to an embodiment of the present invention.

An ROC that is an experiment result is as shown in FIG. 8, and a curve shown in FIG. 8, it is checked that TP is about 0.95 and FP is about 0.04 when a threshold th is 0.15 which means that the highest TP may be obtained in a low FP. Accordingly, in the present invention, a hash authentication threshold is determined as 0.15.

In other words, FIG. 8 is a view showing an ROC curve of a hash authentication threshold.

In the present invention, in order to perform hierarchical authentication and to prevent a copy of a vector model such as vector map with high accuracy, and design drawing, a vector model hashing based on a multi-scale curvature including robustness, uniqueness, and security performances is purposed. In the purposed hashing, by using representative curvatures which are a radius curvature, a turning angle curvature, and a Gaussian curvature, a multi-dimensional feature matrix based on a multi-scale curve action energy distribution of all polylines and polygon objects is generated. The multi-scale curvature action energy distribution is strong on a rigid motion and a form deformation, thus robustness against various attacks and uniqueness for a model are obtained.

From the multi-dimensional feature coefficients, a multi-dimensional intermediate hash coefficient matrix is obtained by performing randomized mapping for a random coefficient with partial exponential bell polynomials.

In addition, from a real number type intermediate hash coefficient matrix, a final binary hash matrix is obtained by using a Lloyd-Max quantizer.

Herein, security and uniqueness performances for randomized mapping of a curvature action energy are required.

For a multi-dimensional hash, a hierarchical authentication in a scale and a curvature type according to a security level of public and private vector models is possible.

From the experiment result, it is checked that the purposed hashing is robust against an object attack such as object simplification, removing, copying, breaking, etc., and a security thereof is ensured since hash uniqueness for three types which are, a model-key, a key, and a model are excellent, and the purposed hashing has a higher differential entropy by about 0.875 to 1.149 than that of a conventional method.

The present invention may be implemented as computer-readable code on a computer-readable recording medium. The computer-readable recording medium includes all types of storage devices in which computer system-readable data is stored.

Examples of the computer-readable recording medium include Read Only Memory (ROM), Random Access Memory (RAM), Compact Disk-Read Only Memory (CD-ROM), magnetic tape, a floppy disk, and an optical data storage device. Furthermore, the computer-readable recording medium may be implemented as carrier waves (for example, in the case of transmission over the Internet).

Moreover, the computer-readable medium may be distributed across computer systems connected via a network, so that computer-readable code can be stored and executed in a distributed manner. Furthermore, functional programs, codes, and code segments to implement the disclosed embodiments may be easily deduced by programmers skilled in the art thereof.

Although the invention has been shown and described with respect to the preferred embodiments, and specific terms have been used, the preferred embodiments and specific terms are used in their general meaning only in order to easily describe the technical content of the present invention and to facilitate the understanding of the present invention, and are not intended to limit the scope of the present invention. It will be understood by those skilled in the art that various changes and modifications may be made without departing from the spirit and scope of the invention as defined in the following claims.

The invention claimed is:

1. A method of protecting a digital model comprising a vector model from being tampered or copied, the method comprising:
    performing rectangular tiling by dividing the vector model into a plurality of rectangular tiles; and
    generating a hash for a tile among the plurality of rectangular tiles by using a hash function hash(M.R)=(H.θ) based on a multi-scale curvature, wherein M represents the vector model, R represents a random key, H represents a binary hash, and θ represents a parameter,
    wherein the hash is generated by:
        re-sampling objects within the tile;
        calculating a multi curvature for each scale; and
        generating the binary hash H by using a Lloyd-Max quantizer and a multi-scale curvature hash coefficient based on the key.

2. A method of authenticating a digital model comprising a vector model by using the hash generated according to claim 1, the method comprising:

extracting a hash H' by using a hash extraction function Dehash(M'.R.θ)=H', wherein M' represents the vector model to be authenticated, R represents the random key, and θ represents the parameter; and authenticating the digital model by comparing the H' with the H.

3. The method of claim 1, wherein the performing rectangular tiling includes:

generating M={Mj} obtained by dividing the vector model M having a NH×NV size into a rectangular tile having a Nh×Nv size; and generating $M_j = \{p_i\}_{i=1}^{|M_j|}$ by extracting polygon and polyline objects among objects belonging to a number of layers within the divided tile, wherein when an entire size of the vector model M is NH×NV, and a ratio scale is 1/RS, the NH×NV size and an actual size of NH×NV is calculated as $(NH \times RS \times 10^{-5}) \times (NV \times RS \times 10^{-5}) = NH \times NV \times RS^2 \times 10^{-10}$ [$km^2$]$N_H \times N_V \times RS^2 \times 10^{-10}$[$km^2$].

4. The method of claim 1, wherein, during the re-sampling objects, the objects are re-sampled in a same sampling interval, and re-sampled virtual vertices are generated, when an original object $p = \{v_i\}_{i=1}^P$ is provided, a sample vertex for the same sampling interval δ is $\hat{p} = \{v_k\}$, when a sample vertex $v_k$ is between and $v_{i-1}$, the sample vertex $v_k$ becomes $v_k = v_{k-1} + \Delta d_k$, $\|\Delta d_k\| = \delta$, $v_k = (x_k, y_k) = (x_{k-1} + \Delta d_x, y_{k-1} + \Delta d_y)$; $f(x_k) = y_k$ by a cubic curve polynomial (cubic polynomial curve) expression corresponding to left/right four vertices $\{v_{k-2} \cdot v_{k-1} \cdot v_i \cdot v_{i-1}\}$ which are two previous resampled vertices $\{v_{k-2} \cdot v_{k-1}\}$ and two ensuing original vertices $\{v_i \cdot v_{i-1}\}$, herein, the sample vertex $v_k$ corresponding to two previous re-sampled vertices $\{v_{k-2} \cdot v_{k-1}\}$ and two ensuing original vertices $\{v_i \cdot v_{i+1}\}$ is represented as $v_{k-2} < v_{k-1} < v_k < v_i < v_{i+1}$, and as a boarder tile of an object end point, when the sample vertex $v_k$ is before a last original vertex $v_n$, that is $v_{k-2} < v_{k-1} < v_k < v_n$, or after, that is $v_{k-2} < v_{k-1} < v_n < v_k$, the sample vertex $v_k$ is determined by quadratic curve $C_k(v_k)$: $f(x) = a_0 + a_1 x + a_2 x^2 + a_3 x^3$ modeling that corresponds to three vertices of $\{v_{k-2} \cdot v_{k-1} \cdot v_n\}$.

\* \* \* \* \*